United States Patent [19]
Hetzel

[11] Patent Number: 5,384,034
[45] Date of Patent: Jan. 24, 1995

[54] CANDLE PRECOATED FILTER FOR RESIDUAL VOLUME FILTRATION

[75] Inventor: Hartmut Hetzel, Cologne, Germany
[73] Assignee: DrM, Dr. Muller AG, Mannedorf, Switzerland
[21] Appl. No.: 64,168
[22] PCT Filed: Sep. 10, 1991
[86] PCT No.: PCT/CH91/00196
§ 371 Date: May 19, 1993
§ 102(e) Date: May 19, 1993
[87] PCT Pub. No.: WO93/04762
PCT Pub. Date: Mar. 18, 1993
[51] Int. Cl.⁶ .................................... B01D 25/22
[52] U.S. Cl. ........................... 210/137; 210/193; 210/236; 210/323.3; 210/346; 210/418
[58] Field of Search ............... 210/101, 109, 137, 193, 210/236, 238, 322, 323.2, 346, 418

[56] References Cited
U.S. PATENT DOCUMENTS

| | | | |
|---|---|---|---|
| 2,261,399 | 11/1941 | Mills et al. | 210/193 |
| 2,523,793 | 9/1950 | Vance | 210/193 |
| 3,891,551 | 6/1975 | Tiedemann | 210/193 |

FOREIGN PATENT DOCUMENTS

| | | |
|---|---|---|
| 0347620 | 12/1989 | European Pat. Off. . |
| 658401 | 11/1986 | Switzerland . |
| 678399 | 9/1991 | Switzerland . |

Primary Examiner—Robert A. Dawson
Assistant Examiner—W. L. Walker
Attorney, Agent, or Firm—Michael J. Striker

[57] ABSTRACT

A candle type precoated filter for residual volume filtration has a pressure vessel having a cylindrical upper part and a conical base, a plurality of filter elements arranged substantially vertically and including at least one residual filter element and other filter elements formed so that the at least one residual filter element is lengthened toward the base and is longer than the other filter elements and a separating wall which separates the residual filter element in an upper portion of the pressure vessel from the other filter elements so as to be tight against media and to project out in a lower portion of the pressure vessel beyond a length of the other filter element.

4 Claims, 2 Drawing Sheets

CANDLE PRECOATED FILTER FOR RESIDUAL VOLUME FILTRATION

BACKGROUND OF THE INVENTION

The present invention relates to a candle precoated filter for residual volume filtration.

More particularly, it relates to a candle type precoated filter for residual volume filtration which includes a cylindrical pressure vessel with a conical base and filter elements which are arranged vertically at collecting tubes and in which at least one residual filter element is lengthened toward the base.

Such candle filters have a cylindrical housing with a conical lower part in which are installed a plurality of filter candles which are generally combined to form registers. The filter candles include a carrier tube on which a rigid or flexible filter medium is arranged. The filtration is effected by flowing through the filter layer from the outside to the inside, a filter cake being formed in a tubular shape on the filter medium. The filtrate flows through the carrier tube to the outlet spout. Cleaning is effected by a brief, percussive reverse flow through the filter medium.

A candle type precoated filter is known from CH-A-658 401 in which one or more filter candles are provided with an enclosing tube which is connected with the filter candle so as to be open at the bottom and sealed at the top. Enclosed and unenclosed filter candles are provided with separate flow-out valves. If the filter inlet and outlet of the unenclosed filter candles are closed and the filter housing is acted upon by a gas, the filter contents are filtered through the enclosed filter candles until the level of the impure liquid has reached the lower edge of the enclosing tube.

However, the known candle filter has disadvantages. For example, when the flow-out of the unenclosed filter candles is closed, the filter cake, depending on its composition, can fall out of the unenclosed filter candles as soon as the filter housing is acted upon by gas due to the absence of differential pressure. The filter cake is then pressed into the narrow annular cross section between the enclosing tube and filter candle and very quickly stops up the latter. This leads to unreasonably long residual filtration times. Even if the filter cake which has dropped down is not pressed into the filter tubes (because the lower edge of the enclosing tubes is arranged quite high in the filter housing), problems occur when cleaning the enclosed filter candles. The filter cake adheres to the inside of the enclosing tube so that the enclosing tube is entirely or partially stopped at least after repeated cleaning.

SUMMARY OF THE INVENTION

Accordingly, it is an object of the present invention to provide a candle type precoated filter, which avoids the disadvantages of the prior art.

More particularly, it is an object of the present invention is to improve a candle type precoated filter in such a way that, on the one hand, no residues impede the residual volume filtration so that residual filtration times are achieved which are distinctly shorter than the main filtration time and on the other hand the residual volume remaining in the filter can be varied in configuration and thus adapted to the cake volume.

This object is met according to the invention in that a separating wall separates the residual filter element in the upper portion of the pressure vessel from the rest of the filter elements so as to be tight against media and projects out beyond the length of the main filter elements in the lower portion.

Since the free cross section around the filter candles is practically unrestricted by the separating wall, there is no risk of stoppage either during the residual volume filtration or when cleaning the filter candles.

The filter candles in the residual filtration space and in the main filtration space have separate outlet valves. After closing the feed of impure liquid and the outlet of the main filter candles and after the admission of gas to the main filtration space, the entire volume of impure liquid in the filtration space can be filtered off until the lower edge of the separating wall via the residual filter candles. The gas penetrates and filtration stops only when the level of impure liquid falls below the lower edge of the separating wall.

It is advisable to provide at least one externally closable opening in the region of the lower part of the separating wall. However, it is also possible to arrange one or more externally closable openings one below the other. Here the advantage consists in that the residual volume in the filter housing can be varied in configuration when the gas penetrates and accordingly adapted to the cake volume. An arrangement having a slot in the separating wall which can be closed externally by a slide in the manner of a flood gate is particularly advantageous. When residual filtration begins, the slide in the separating wall is first fully opened. The filter cake dropping down from the main filter candles collects in the cone of the filter housing and only the impure liquid standing above the latter is pressed into the residual filter space. After the start of gas penetration, the slide in the separating wall is closed slowly so that practically minimum residual volume can be achieved.

In its simplest construction the separating wall can be a planar wall which projects into a symmetrical cone. But it can also be constructed as a central tube or double separating wall in a filter with a symmetrical-conical lower part.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
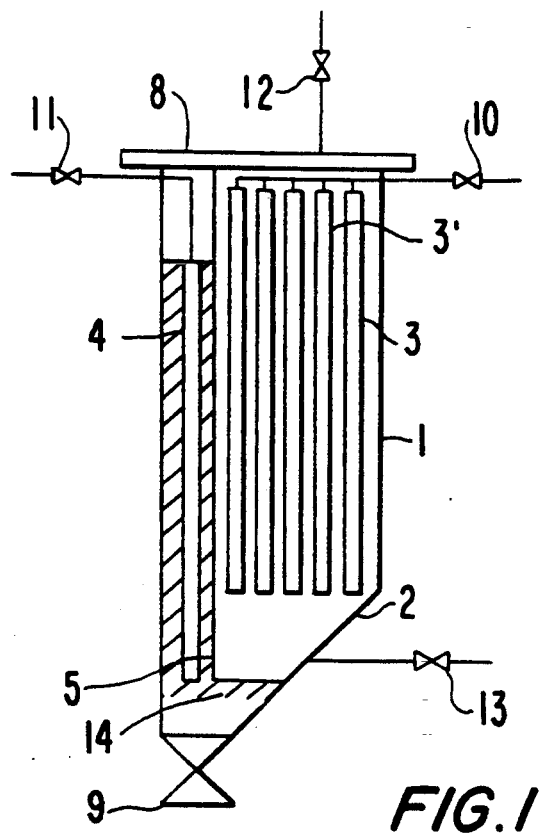
FIG. 1 shows a section through the filter according to the invention with a separating wall.

According to FIG. 1, the filter has a pressure vessel 1 with a conical base 2. A plurality of filter elements 3, 3' are arranged at collecting tubes in the interior of the pressure vessel I and closed by a valve 10 outside the vessel wall. Residual filter elements 4 are connected with a valve 11 outside the vessel wall via a collecting tube. A separating wall 5 is welded in the pressure vessel and sealed against a cover 8. A pressure line with a valve 12 is provided in the cover 8. An outlet valve 9 and a line with a valve 13 for the impure liquid feed are arranged in the apex of the cone 2. The level of the residual volume occurring when the filter is acted upon via the valve 12 is designated by position 14.

Figure 2:
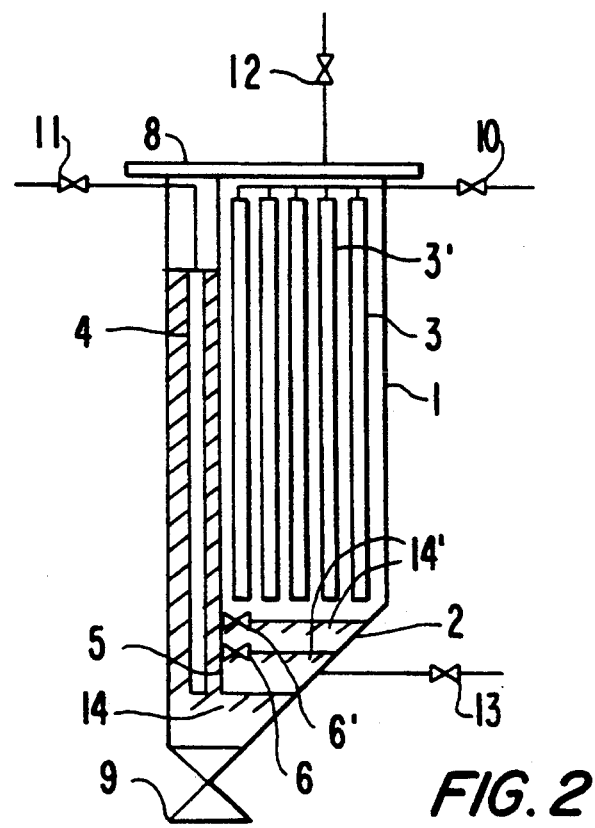
FIG. 2 shows the filter according to the invention, two openings being arranged in the lower part of the separating wall, which openings can be closed externally by valves and enable the adjustment of three different levels of residual volume.

According to FIG. 2, openings which are closable from the outside by valves 6, 6' are installed in the lower portion of the separating wall 5. The level of the residual volume 14, 14' can be changed in stages from the upper edge of the uppermost opening to the lower edge of the separating wall. The volume of the residual filtration can be reduced in stages with these valves. Instead of the valves, a slot can also be inserted in the separating wall and closed from the outside by a slide. The volume of the residual filtration can accordingly be reduced in a continuous manner and hence exactly adapted to the filter cake volume possibly dropping from the main filtration space.

Figure 3:
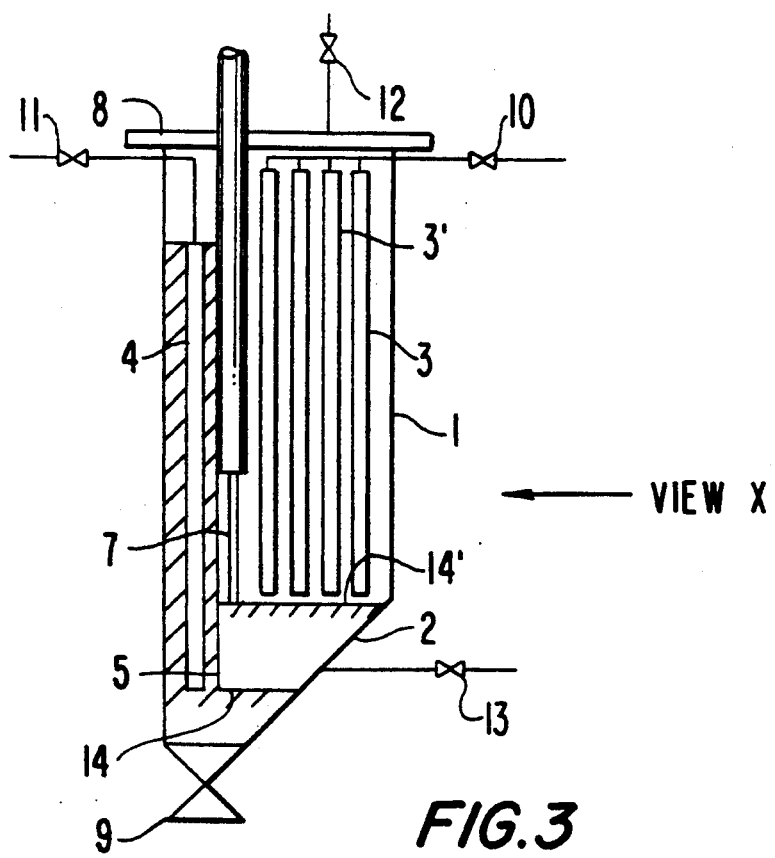
FIGS. 3, 3a show the filter, according to the invention, in which a slot is inserted in the lower portion of the separating wall, which slot can be closed in stages by an externally actuated slide.
Figure 3A:
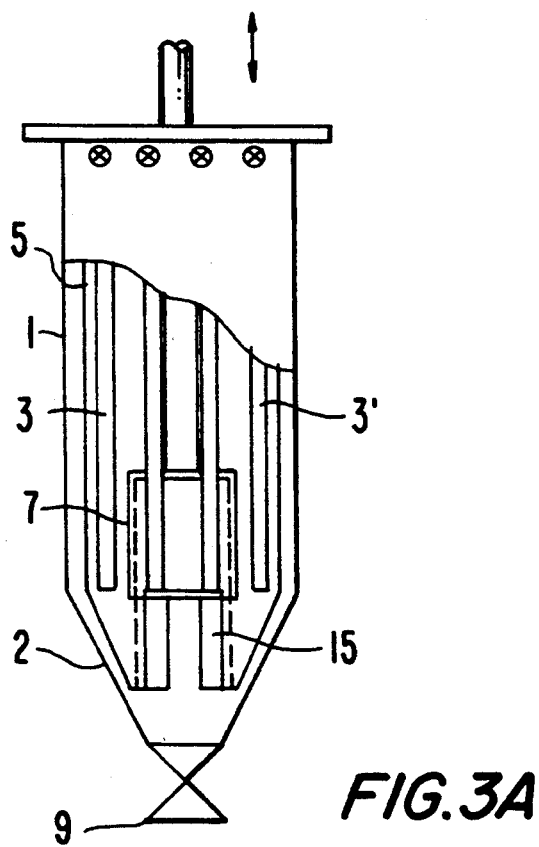

According to FIGS. 3 and 3a, a slot 15 is inserted into the separating wall 5, which slot 15 can be covered (closed) in a continuous manner by an externally actuated slide 7. The level of the residual volume remaining in the housing after the filter is acted upon by compressed gas can accordingly be lowered in a continuous manner from the upper edge of the slot 15 to the lower edge of the separating wall 5.

It will be understood that each of the elements described above, or two or more together, may also find a useful application in other types of constructions differing from the types described above.

While the invention has been illustrated and described as embodied in a candle precoated filter for residual volume filtration, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

1. A filter for residual volume filtration, comprising a pressure vessel having a cylindrical upper part and a conical base; a plurality of filter elements arranged substantially vertically and including at least one residual filter element and other filter elements formed so that said at least one residual filter element is lengthened toward said base and is longer than said other filter elements; and a separating wall which separates said at least one residual filter element in an upper portion of said pressure vessel from said other filter elements so as to be tight against media and to project out in a lower portion of said pressure vessel beyond a length of said other filter element, said at least one residual filter element having a lower portion projecting downwardly below said other filter elements, said separating wall being provided with at least one opening in the region of said lower portion of said at least one residual filter element and being closeable from an outside.

2. A candle type precoated filter as defined in claim 1; and further comprising collecting tubes, said filter elements being arranged vertically at said collecting tubes.

3. A candle type precoated filter as defined in claim 1; and further comprising means for closing said at least one opening from outside.

4. A filter for residual volume filtration, comprising a pressure vessel having a cylindrical upper part and a conical base; a plurality of filter elements arranged substantially vertically and including at least one residual filter element and other filter elements formed so that said at least one residual filter element is lengthened toward said base and is longer than said other filter elements; a separating wall which separates said at least one residual filter element in an upper portion of said pressure vessel from said other filter elements so as to be tight against media and to project out in a lower portion of said pressure vessel beyond a length of said other filter element, said separating wall having a lower portion; a slot inserted in said lower portion of said separating wall; and a slide which is movable in a continuous manner from outside and closing said slot.

* * * * *